April 14, 1925.

E. C. DOELLE ET AL 1,533,495

WATER HEATER

Filed Jan. 25, 1924

INVENTORS.
Edward C. Doelle
Edward J. Eggert
BY A. M. Carlsen
ATTORNEY.

Patented Apr. 14, 1925.

1,533,495

UNITED STATES PATENT OFFICE.

EDWARD C. DOELLE AND EDWARD J. EGGERT, OF ST. PAUL, MINNESOTA; SAID DOELLE ASSIGNOR TO SAID EGGERT.

WATER HEATER.

Application filed January 25, 1924. Serial No. 688,400.

*To all whom it may concern:*

Be it known that we, EDWARD C. DOELLE and EDWARD J. EGGERT, citizens of the United States, residing at St. Paul, in the county of Ramsey and State of Minnesota, have invented certain new and useful Improvements in Water Heaters, of which the following is a specification.

Our invention relates to water heaters and the object is to provide a simple and highly efficient heater adaptable in larger sizes for heating dwellings or other buildings with hot water, and in smaller sizes for quickly and economically heating a volume of water for household and other purposes. A further object is to utilize the maximum quantity of heat units available in any given quantity of fuel used in our device.

In the accompanying drawing:

Fig. 1 is a partly sectional elevation of our improved water heating device in its preferred form.

Fig. 2 is an enlarged sectional elevation as on line 2—2 in Fig. 1, with the outer and inner shells modified and some details added.

Fig. 3 is a section view about as on line 3—3 in Fig. 1.

Referring to the drawing by reference numerals, the preferred form of our device comprises an upright cylindrical shell 5 spaced above a floor 6 by supports 7, the top of the shell being provided with a conical cover 8 the top end of which communicates with an outlet pipe 9.

Within said shell we place a continuous, coiled water pipe 10 entering the shell near its bottom, as at 11 in Fig. 3, and thence being coiled upwardly a sufficient number of coils, resembling a helical coil spring, to a point near the top of the shell where the pipe is straightened out and extended from the shell as at 12 (Fig. 1) and connected to a heating system or reservoir (not shown) as desired. The coils of pipe may be kept in fixed vertically spaced relation by a number of spacers 13 (Fig. 2).

14 is an inner cylindrical shell of such size as to contact with the innermost side of the water pipe coils. The top of this shall may be at the same height as the outer shell but its lower end terminates just above the first complete water pipe coil in the lower end of the shell (see Fig. 2) and may at said lower end be bent or flared inwardly as at 14ª for a purpose to be described.

15 is a fuel pipe entering the outer shell parallel to the water pipe and is coiled in said parallel relation to and follows one complete coil of the water pipe, as best shown in Fig. 1. The center of the fuel pipe is above and inward radially from the center of the water pipe, and the diagonally upward and outwardly exposed face of said pipe is provided with a row of holes 16 permitting outlet of fuel which is ignited and the flames come in contact with the upper surface of the lowest water coil and the lower surface of the next higher coil as at 17 in Fig. 2. The intense heat to which said coils is thus exposed, heats the water within the pipe rapidly. The flames from the fuel burner are guided toward the water pipes by the flare 14ª of the inner shell 14 and cannot escape upwardly within said shell. Thus the burning fuel is guided between the outer shell 5 and the inner shell and will move upwardly, spirally in what may most advantageously be termed a heat flue formed between the vertically spaced coils. This spiral heat flue causes the burning gases to heat all of the water coils, insuring a maximum water heating capacity and the completely burned gas and smoke is carried out through the flue 9.

The inner and outer shells are of such size as to be constantly bearing against the inner and outer sides of the coils. To insure that they are tight against the coils so as to prevent the heat from going up vertically past them, we prefer to line the inner surface of shell 5 with sheet asbestos as at 18 and the outer surface of the shell 14 is likewise provided with asbestos as at 19.

In Fig. 2 the inner shell and in Fig. 3 both shells are shown split vertically. The outer shell (as in Fig. 3) may be provided with a thumb nut 20 on a screw 21 engaging in brackets 22 fixed on opposite sides of the split. Adjustment of the screw will allow the shell to be contracted as tight as desired about the water coils. The inner shell has like spaced brackets 22ª between which a compression coil spring 23, about a bolt 24, tends to spread the jacket diametrically against the inner sides of the water coils.

In Fig. 2, 25 is an inwardly disposed continuous spiral groove in the outer shell 5 and 26 is a like continuous but outwardly disposed groove in the inner jacket 14, both grooves arranged to register horizontally and spaced vertically half way between the water coils. This makes a continuous heat flue which is narrow in cross section at a point half way between any two adjacent coils and the burning gases are guided more effectively to heat the water coils on their adjacent rounded surfaces as at 27 in Fig. 2.

28 is a water coil support bracket secured horizontally as at 29 in the outer shell 5. It extends inwardly to support the lowest water coil and thence bent upwardly in an ogee curve as at 28$^a$, its inner bent portion supporting the fuel pipe 15 in proper spaced relation to the water coil. This bracket may be in the form of a U-bolt 28$^b$, as to the left in Fig. 2, having an inwardly and upwardly disposed integral hook 28$^c$ supporting the fuel pipe.

The operation of our device has been fully disclosed in the above description. Various modifications such as increasing the length of the fuel burner pipe or other means for keeping the inner and outer shells in constant pressing contact against the water coils may be used without departing from the spirit of the invention.

The main feature of our device is to obtain the maximum water heating efficiency by guiding the burning gases and heated air upwardly, spirally between the water coils in the continuous heat flue.

What we claim is:

1. In a water heater, a vertically arranged spiral water pipe, a cylindrical longitudinally split outer shell inclosing the coils of said pipe and adjusting means for causing said shell to engage the outer sides thereof, an inner longitudinally split cylindrical shell, automatic means causing said inner shell to continuously engage the inner sides of the said coils, means for heating the entire length of coiled pipe, and means for vertically spacing the adjacent coils of the water pipe, said heating means comprising a fuel conducting pipe fixed in parallel relation to the lowest spiral portion of the pipe, said fuel pipe having a row of outwardly and upwardly directed fuel outlet opertures adapted to direct flames from ignited fuel onto the adjacent surfaces of the water pipe.

2. The structure specified in claim 1 in which said adjusting means on the outer shell comprises a number of pairs of L-shaped brackets, each pair comprising horizontally registering brackets secured one at each side of the split of the shell, a screw passed through both brackets and a thumb-nut on said screw for adjusting the brackets relative to each other.

3. The structure specified in claim 1 in which said adjusting means on the outer shell comprises a number of pairs of L-shaped brackets, each pair comprising horizontally registering brackets secured one at each side of the split of the shell, a screw passed through both brackets and a thumb-nut on said screw for adjusting the brackets relative to each other; said automatic expanding means for the inner shell comprising a number of pairs of horizontally registering brackets fixed one in each pair at each side of the split, and a compression coil spring arranged in compression between each such pair of brackets, as shown and described.

4. The structure specified in claim 1, said outer shell provided with an inwardly disposed continuous spiral groove, said inner shell provided with a similar outwardly disposed groove, said grooves adapted to register horizontally and half way between any two vertically adjacent sections of the water pipe, substantially as shown and described.

In testimony whereof we affix our signatures.

EDWARD C. DOELLE.
EDWARD J. EGGERT.